United States Patent
Cover (12) United States Patent  (10) Patent No.: US 6,412,281 B2
Cover  (45) Date of Patent: Jul. 2, 2002

(54) METHODS AND APPARATUS FOR GENERATING HYDRODYNAMIC ENERGY AND ELECTRICAL ENERGY GENERATING SYSTEMS EMPLOYING THE SAME

(76) Inventor: John H. Cover, 376 Calle Borrego, San Clemente, CA (US) 92672

( * ) Notice: Subject to any disclaimer, the term of this patent is extended or adjusted under 35 U.S.C. 154(b) by 0 days.

(21) Appl. No.: 09/808,397

(22) Filed: Mar. 12, 2001

Related U.S. Application Data (63) Continuation-in-part of application No. 09/595,009, filed on Jun. 16, 2000, now abandoned.
(60) Provisional application No. 60/165,469, filed on Nov. 15, 1999.

(51) Int. Cl.$^7$ .................................................. F01K 1/00
(52) U.S. Cl. ........................................ 60/670; 60/675
(58) Field of Search ................................ 60/670, 675

(56) References Cited

U.S. PATENT DOCUMENTS

| | | | | |
|---|---|---|---|---|
| 3,953,971 A | * | 5/1976 | Parker ........................ | 60/641 |
| 4,187,686 A | * | 2/1980 | Pommier ................... | 60/675 X |
| 4,192,145 A | * | 3/1980 | Tanaka ........................ | 60/675 |
| 4,318,275 A | * | 3/1982 | Brown et al. ............... | 60/675 |
| 4,356,401 A | * | 10/1982 | Santi ......................... | 290/1 R |
| 5,488,828 A | * | 2/1996 | Brossard ..................... | 60/675 |
| 6,073,448 A | * | 6/2000 | Lozada ....................... | 60/641.2 |

* cited by examiner

*Primary Examiner*—Hoang Nguyen
(74) *Attorney, Agent, or Firm*—Eric K. Satermo

(57) ABSTRACT

An energy generating system includes a conduit in the form of a loop with an upflow section and a downflow section. A working liquid such as water is received within the conduit and has an ambient temperature and a boiling point. A supply subsystem including a vessel in communication with an input port at a lower portion of the upflow section of the conduit is configured to provide to the conduit a pumping liquid. The pumping liquid has a boiling point greater than the ambient temperature and less than the boiling point of the working liquid. A heating subsystem is configured to heat the working liquid within the conduit to a temperature greater than the boiling point of the pumping liquid by a predetermined differential. Accordingly, the pumping liquid is vaporized after passing through the input port into the working fluid, thereby generating pumping gas. The pumping gas causes the working liquid to flow upwardly in the upflow section and to circulate in the conduit, for example, by a pressure differential between the upflow section and the downflow section. An electrical generating plant is configured to harness the hydrodynamic energy of the working liquid to generate electricity.

20 Claims, 9 Drawing Sheets

METHODS AND APPARATUS FOR GENERATING HYDRODYNAMIC ENERGY AND ELECTRICAL ENERGY GENERATING SYSTEMS EMPLOYING THE SAME

CROSS REFERENCE TO RELATED APPLICATIONS

The present application is a continuation-in-part application of U.S. patent application Ser. No. 09/595,009 filed Jun. 16, 2000, now abandoned, which application claims priority on U.S. Provisional Application for Patent Ser. No. 60/165,469 filed Nov. 15, 1999.

BACKGROUND OF THE INVENTION

1. Field of the Invention

The present invention relates to systems for converting one form of energy to another. More particularly, the present invention relates to energy conversion systems and associated methodology in which thermal energy is converted to electrical energy. The present invention is particularly beneficial in that only a small amount of thermal energy needs to be input into the system to generate a relatively large amount of electrical energy. Accordingly, the systems and methodology of the present invention is highly efficient, productive, and cost effective.

2. Description of the Related Art

The art presents any number of approaches for generating electricity at high efficiency and low costs. One such approach is disclosed in U.S. Pat. No. 4,571,534 in the name of John H. Cover, the applicant in the present application, the entire disclosure of which is incorporated herein by reference. Other conventional approaches include steam turbine generation, hydroelectric plants, nuclear power plants, solar power plants, and so on.

While conventional system generate electricity and are constantly being improved to enhance efficiency, a number of drawbacks are inherent. First of all, the size and complexity of conventional systems effect cost and often limit installation sites. In addition, even though efficiency is constantly being increased, relatively large amounts of energy still need to be input into the systems to generate electricity.

In view of the foregoing, there remains a need in the art for energy generating systems that are highly efficient and low in cost to produce affordable electricity.

BRIEF SUMMARY OF THE INVENTION

The present invention provides systems and associated methodology for generating hydrodynamic energy. The hydrodynamic energy may then be harnessed by an electricity generating plant to produce electricity. As discussed in detail below, the energy systems of the present invention are inherently advantageous over conventional systems.

According to a preferred embodiment, an energy generating system of the invention includes a conduit including an upflow section and an input port disposed at a lower portion thereof. Within the conduit is received a working liquid having an ambient temperature and a boiling point. A supply subsystem including a vessel in communication with the input port of the conduit is configured to provide to the conduit a pumping liquid. According to a preferred embodiment, the pumping liquid has a boiling point greater than the ambient temperature and less than the boiling point of the working liquid.

The energy generating system may also include a heating subsystem configured to heat the working liquid within the conduit to a temperature greater than the boiling point of the pumping liquid, preferably, by a predetermined differential. Accordingly, the pumping liquid is vaporized after passing through the input port into the working fluid, thereby generating pumping gas that causes the working liquid to flow upwardly in the upflow section and to circulate in the conduit. The hydrodynamic energy of the circulating working liquid may then be harness by an electricity generating plant to generate electricity.

One of the advantages of the invention is that the system is high efficiency at low costs. For example, the working liquid may be water, and the working liquid may be a refrigerant with a boiling point less than 70° F. Accordingly, a relatively small amount of heat is needed to maintain the temperature of the water at a level greater than the boiling point of the refrigerant.

Another advantage of the invention is expandability. For example, a plurality of the conduits may be cascaded together such that the pumping gas from one conduit may be condensed and then provided as a pumping liquid to a subsequent conduit. Accordingly, efficiency is enhanced. In addition, latent heat from the condensation process of the pumping gas may be fed back to the heating subsystem to heat the working liquid, thereby further enhancing the efficiency of the system.

Still further advantages relate to size. For example, a plurality of conduits each having a height of the upflow section of about 100 feet may be installed in a tank of heated fluid with a footprint (i.e., a size) substantially small than the space occupied by a conventional system generating the same amount of energy.

Other objects, features, and advantages of the present invention will become apparent to those skilled in the art from a consideration of the following detailed description taken in conjunction with the accompanying drawings.

DETAILED DESCRIPTION OF THE INVENTION

Figure 1:
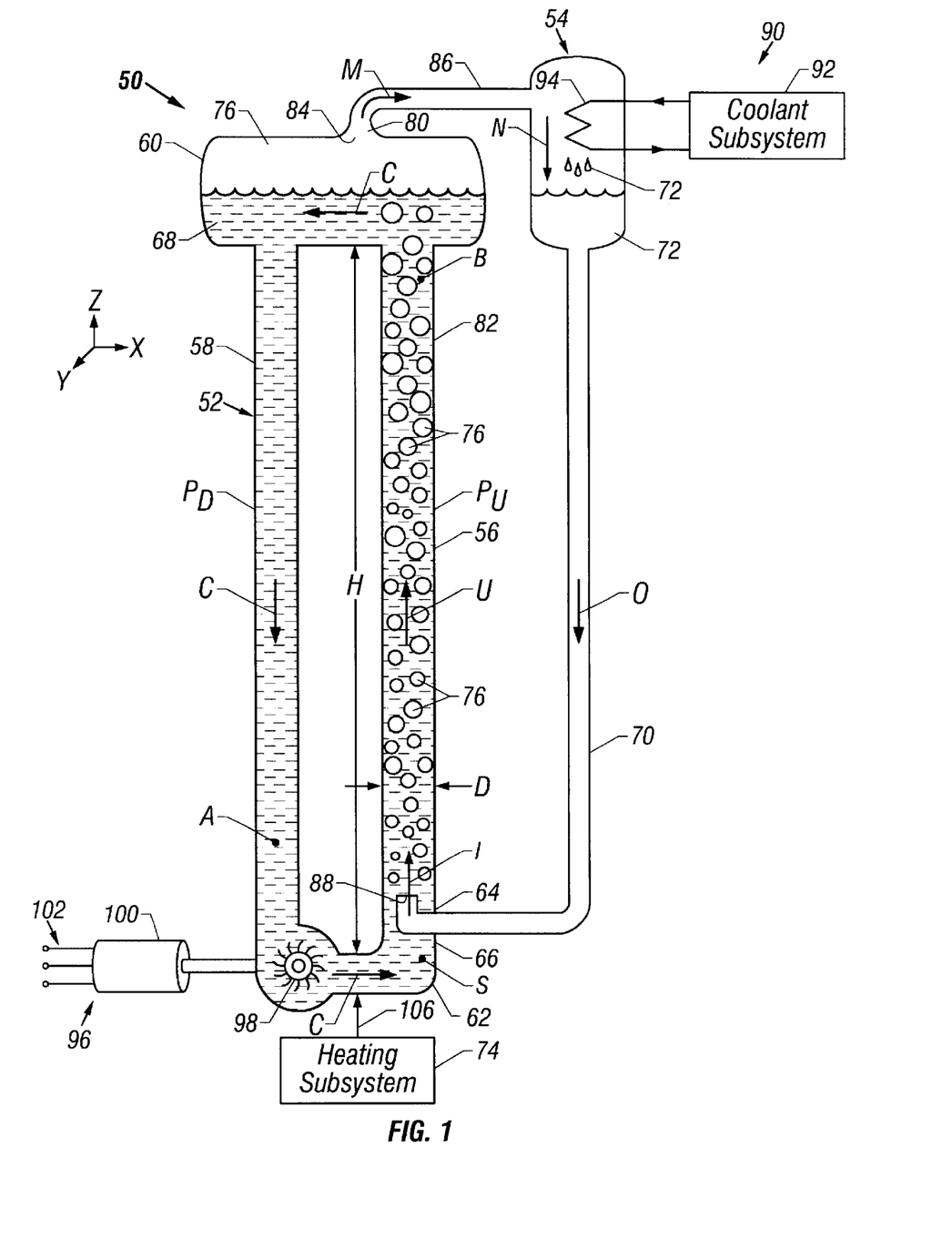
FIG. 1 is a schematic view of an exemplary system for generating hydrodynamic energy in accordance with the principles of the present invention, particularly illustrating a conduit in which a working liquid is maintained at a temperature that vaporizes a pumping liquid upon injection therein, thereby generating pumping gas and causing the working liquid to circulate.

Referring more particularly to the drawings, a system for generating hydrodynamic energy is illustrated in accordance with an exemplary embodiment of the present invention in FIG. 1 and indicated generally with reference numeral 50. According to the principles of the present invention, exemplary system 50 generates hydrodynamic energy by converting heat into motion. The generated hydrodynamic energy may then in turn be harnessed to generate electricity.

According to a preferred embodiment, exemplary energy generating system 50 includes a conduit 52 and a supply subsystem 54. The conduit 52 is preferably in the form of a loop with an upflow section 56 and a downflow section 58, with a top section 60 and a bottom section 62 respectively disposed therebetween. An input port 64 is disposed at a lower portion 66 of the upflow section 56 of the conduit 52. The conduit 52 is configured to receive a working liquid 68 that has an ambient temperature $T_a(w)$ and a boiling point $T_{bp}(w)$. For the purposes of this description, the ambient temperature $T_a(w)$ of the working liquid 68 may be defined as the temperature of the working liquid 68 without the addition of external heat, which will be described in detail below.

Exemplary supply subsystem 54 may include a vessel 70 in communication with or connected to the input port 64 of the conduit 52. The supply subsystem 54 is configured to provide to the conduit 52 via the vessel 70 a pumping liquid 72 that has a boiling point $T_{bp}(P)$ greater than the ambient temperature $T_a(w)$ of the working liquid 68 and less than the boiling point $T_{bp}(w)$ of the working liquid 68, or:

$$T_{bp}(w) > T_{bp}(p) > T_a(w).$$

Exemplary energy generating system 50 may also include a heating subsystem 74 that is configured to heat the working liquid 68 received within the conduit 52 to a working temperature $T_W$ that is greater than the boiling point $T_{bp}(p)$ of the pumping liquid 72 by a predetermined temperature differential $\Delta T$, or:

$$T_W = T_{bp}(P) + \Delta T.$$

Accordingly, in operation, the pumping liquid 72 is vaporized after passing through the input port 64 into the working fluid 68 as shown by arrow I, thereby generating pumping gas 76 in the form of bubbles.

The formation of the pumping gas 76 causes the working liquid 68 to flow upwardly in the upflow section 56 as shown by arrow U. The upward flow of the working liquid 68 in the upflow section 56, in turn, causes the working liquid 68 to circulate within the conduit 52 as shown by arrows C. The circulating working liquid 68 may then be harnessed by another system, for example, one for generating electricity, which will be discussed in more detail below.

The vaporization of the pumping liquid 72 absorbs heat from the working liquid 68, such that the temperature of the working liquid 68 at the top section or separator 60 is less than the temperature of the working liquid 68 slightly upstream from the input port 64. Accordingly, in order to maintain the temperature of the working liquid 68 at a level sufficient to vaporize the pumping liquid, energy in the form of heat needs to continuously be added to the energy system 50. According to the present invention, the amount of energy input into the system 50 is substantially less than the amount of energy generated by the system 50, which will also be discussed in more detail below.

Although the working liquid 68 loses heat due to vaporization of the pumping liquid 72, the amount of heat is substantially small as the pumping liquid 72 preferably has a low heat of vaporization. In accordance with one of the preferred embodiments of the invention, the boiling point T$bp$(p) of the pumping liquid 72 is less than 100° Fahrenheit (F.) and, more preferably, less than 70° F. For example, if the pumping liquid 72 is dichloromonofluoromethane (i.e., Freon-21), then the boiling point $T_{bp}(p)$ of the pumping liquid 72 is 48° F. Alternatively, if dichlorotetrafluoromethane (i.e., Freon-114), then the boiling point $T_{bp}(p)$ of the pumping liquid 72 is 38° F. Accordingly, only a small amount of heat is required to vaporize the pumping liquid 72. In turn, the amount of heat removed from the working liquid 68 is relatively small, so that the amount of heat needed to be returned to the working liquid 68 by the heating subsystem 74 is relatively small. Those skilled in the art will appreciate other refrigerants, as well as other compounds, may be used as the pumping liquid.

Although any differential may be used, to minimize the amount of energy input into the system 50, it is preferable to minimize the temperature differential $\Delta T$ in certain installations. For example, in many embodiments, the predetermined differential $\Delta T$ may be less than about 10° F. Accordingly, in the Freon-13 example provided above, if the working liquid 68 is water, then the water would need to be heated to a working temperature greater than 38° F., for example, about 40° F. In other embodiments, the predetermined differential $\Delta T$ may be greater than about 10° F., such as embodiments where the pumping liquid 72 has a relatively high boiling point $T_{bp}(P)$ so that vaporization of the pumping liquid 72 pulls a substantially amount of heat from the working liquid 68.

Figure 2:
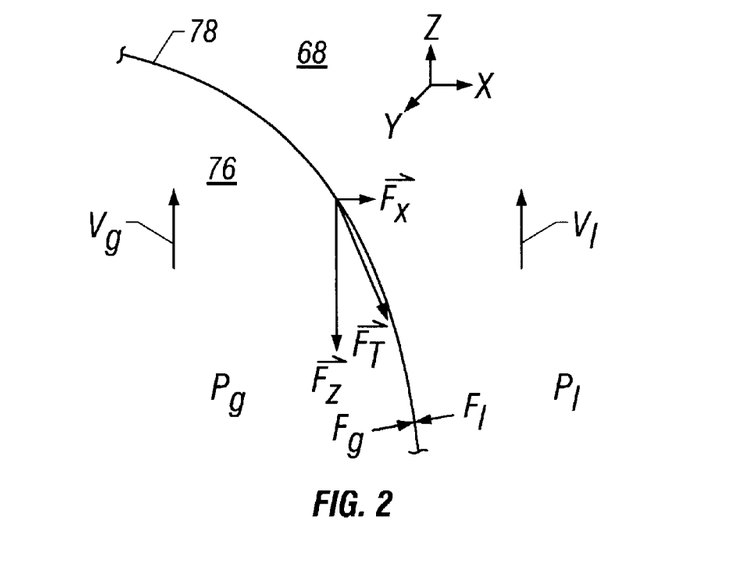
FIG. 2 is a fragmentary schematic view of a gas-liquid interface defined between the pumping gas and the working liquid, particularly illustrating forces acting upon the interface.

Turning for a moment to physics, the pumping gas 76 in the form of bubbles causes the working liquid 68 circulate within the conduit 52. One of the physical principles causing the circulation is shown in FIG. 2 which illustrates a gas-liquid interface 78 defined between the working liquid 68 and the pumping gas 76. As shown, the pumping gas 76 has a velocity $v_g$ with a magnitude greater than that of a velocity $v_l$ of the working liquid 68 at any given vertical location in the upflow section 56 of the conduit 52, or:

$$|v_g|>|v_l|.$$

Accordingly, a force $F_K$ due to kinetic friction is created between the working fluid 68 and the pumping gas 76 at the gas-liquid interface 78. The total force $F_K$ due to kinetic friction at any given point on the interface 78 may be define as the sum of the component forces in each Cartesian direction x, y, and z, or:

$$F_K=F_X+F_Y+F_z.$$

The component force $F_y$ in the y direction is not shown in FIG. 2 for clarity.

The component force with the greatest magnitude comprising the total force $F_K$ is the force in the direction of the flow along the vertical, or z, axis, namely, component force $F_z$. Accordingly, the total force $F_K$ acts on the working liquid 68 substantially in the vertical direction, thereby pushing or urging the working liquid upwardly.

As shown in FIG. 2, other forces act on the gas-liquid interface 78, including an outwardly acting force $F_g$ due to pressure $P_g$ exerted by the pumping gas 76 and an inwardly acting force $F_l$ due to pressure $P_l$ exerted by the working liquid 68. The liquid pressure $P_l$ within the upflow section 56 of the conduit 52 is a function of vertical distance z, namely, the liquid pressure $P_l$ is inversely proportion to the vertical location or height within the upflow section 56. At the same time, the gas $P_g$ pressure remains substantially constant. Accordingly, while moving upwardly in the upflow section 56 of the conduit 52, each bubble of the pumping gas 76 expands as shown in FIG. 1, thereby increasing the area of the gas-liquid interface 78. This expansion of the pumping gas 68 and increase in interface area further enhances the effect of the force FT due to kinetic friction in causing the working liquid to flow upwardly in the upflow section 56 of the conduit 52.

Another physical principle effecting upward flow of the working liquid 68 in the upflow section 56 of the conduit 52 regards a pressure differential of the working liquid 68 between the upflow section 56 and the downflow section 58. More specifically, as shown in FIG. 1, the working liquid 68 has a pressure $P_U$ within the upflow section 56 and a pressure $P_D$ within the downflow section 58 of the conduit 52. Although both pressures are a function of vertical height in the z direction within the sections, downflow pressure $P_D$ of the working liquid 68 within section 58 is greater than upflow pressure $P_U$ of the working liquid 68 within section 56. This pressure differential causes the working liquid 68 within the downflow section 58 to flow through the bottom section 62 of the conduit 52 to the upflow section 56.

As an example, if a ratio of working liquid to pumping gas in the upflow section 56 is about 50:50, then the upflow pressure $P_U$ is about one half of the of the downflow pressure $P_D$. Correspondingly, a density $D_U$ of the mixture of working liquid 68 and pumping gas 76 in the upflow section 56 is about one half of a density $D_D$ of the working liquid 68 in the downflow section 58. As an example of a pressure differential of the working liquid 68 from point A in the downflow section 58 to point B in the upflow section 56, given a height H of the upflow section 56 of about 50 feet and a diameter D of the upflow section of about 5 feet, the pressure differential would be about 10.8 pounds per square inch (PSI).

With additional reference to FIG. 1, exemplary supply subsystem 54 of the invention may include an inlet 80 in communication with or disposed in the conduit 52. In general, inlet 80 is disposed at an upper portion 82 of the upflow section 52 so that the pumping gas 76 is passable therethrough. More specifically, the conduit 52 may include an output port 84 formed in the top section or separator 60 thereof to which a vessel 86 with the inlet 80 of the supply subsystem 54 is connected. The inlet 80 is in communication with an outlet 88 of the vessel 70. As shown, the separator 60 is preferably enlarged or domed shaped to facilitate the separation of the pumping gas 76 from the working liquid 68.

Figure 3:
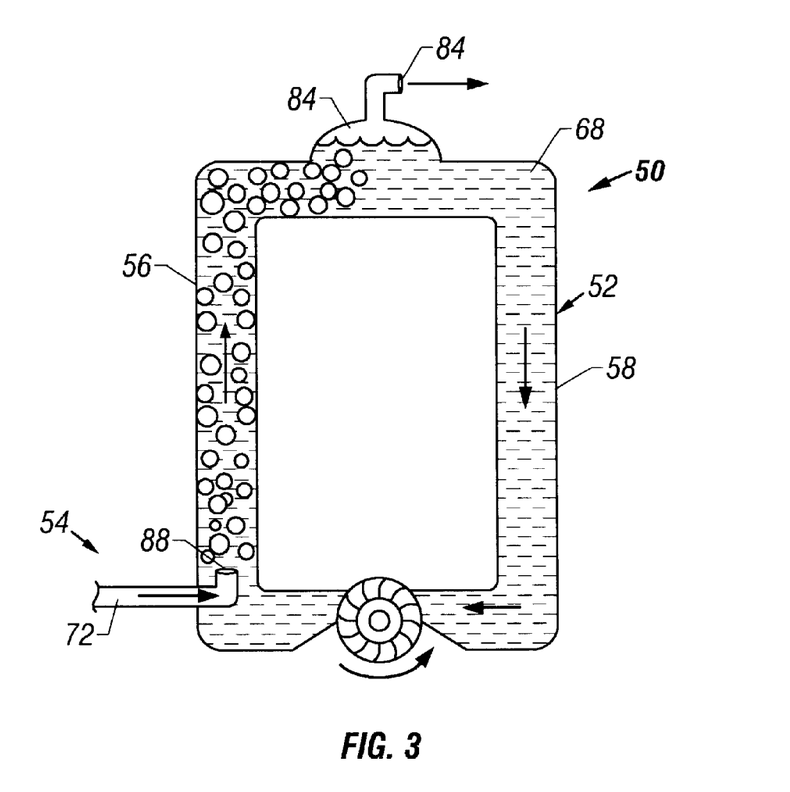
FIG. 3 is a schematic view of the exemplary hydrodynamic energy generating system of the present invention, particularly illustrating a system in which pumping gas is exhausted to the atmosphere.

In addition, exemplary supply subsystem 54 according to a preferred embodiment includes a condenser 90 connected to the inlet 80 for condensing the pumping gas 76 into pumping liquid 72. The condenser 92 may be any type known in the art, for example, including a coolant subsystem 90 with a coil 94 configured to remove heat from the pumping gas 76. Accordingly, the pumping gas 76 passes through inlet vessel 86 as shown by arrow M and is condensed into the pumping liquid 72 as shown by arrow N, which, in turn, passes through outlet vessel 70 as shown by arrow 0. Although the pumping gas 76 may be exhausted to the atmosphere through output port 84, as shown in the exemplary embodiment of FIG. 3, the recycling of the pumping liquid and gas may be beneficial in certain preferred embodiments and implementations of the invention.

With continued reference to FIG. 1, as mentioned above, the hydrodynamic energy generated by system 50 may be harnessed in accordance with any known means in the art. One preferred embodiment of the invention includes an electrical generating plant 96 including one or more turbines 98 connected to at least one generator 100 with transmission lines 102 as an output. Exemplary generating plant 96 is configured so that the turbine 98 is disposed within the conduit 52, preferably downstream of the top section 60 or upstream of the outlet 88 of the supply subsystem 54. Accordingly, as the working liquid 68 circulates within the conduit 52, the turbine 98 is driven to rotate, which rotation is transferred to the generator 100 to generate electricity. Those skilled in the art will appreciate that any number of turbines 96 may be disposed within the conduit 52 to drive one or more generators 100.

Figure 4:
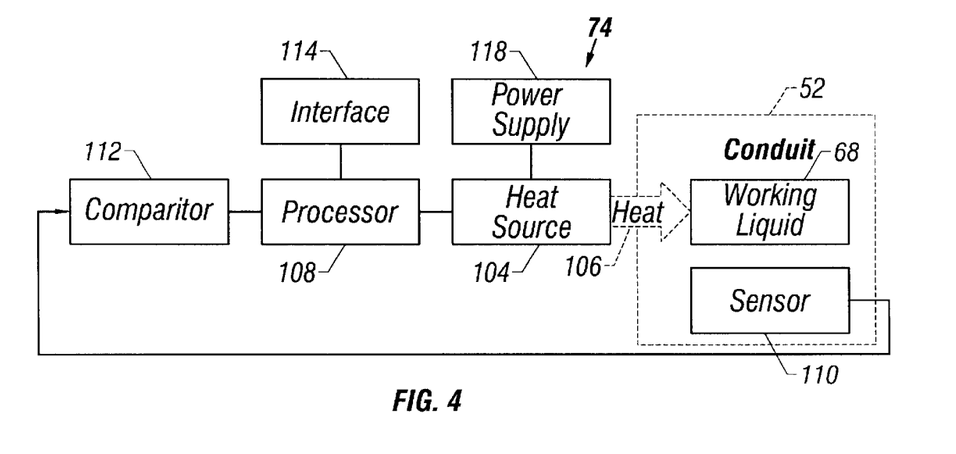
FIG. 4 is a block diagram of an exemplary embodiment of a heating subsystem of the invention, particularly a heating subsystem that is configured to heat the working liquid to a desired working temperature.

Referencing FIG. 4, an exemplary embodiment of the heating subsystem 74 may include a heat source 104 configured to provide heat 106 to the working liquid 68. According to a preferred embodiment, the heating subsystem 74 is configured to regulate the temperature of the working liquid 68 at a desired level, that is, at the working temperature $T_W$ that is substantially equal to the boiling point $T_{bp}(p)$ of the pumping liquid 72 plus the predetermined temperature differential $\Delta T$, or $T_W=T_{bp}(p)+\Delta T$ as mentioned above. The heat source 104 may be configured to employ a variety of different heat types, including solar, geothermal, industrial waste heat, and fuels.

In view of this preferred embodiment, the heating subsystem 74 of the invention may include a processor 108 in communication with the heat source 104 and a sensor 110 disposed operative relationship with the working liquid 68. Preferably, the sensor 110 is located in the conduit 52 slightly upstream from the outlet 88 of the supply subsystem 54, as indicated at point S in FIG. 1. The sensor 110 is configured to output a signal indicative of the temperature of the working liquid 68 (that is, a sensed temperature $T_S$) to a comparitor 112 connected to the processor 108. The comparitor 112 is configured to compare the signal from the sensor 110 to the desired working temperature $T_W$. If the sensed temperature $T_S$ is less than the desired working temperature $T_W$, then the processor 108 may actuate the heat source 104 to increase the amount of heat 106 supplied to the working liquid 68 until the sensed temperature $T_S$ is substantially equal to the desired working temperature $T_W$. A user interface 114 may be provided to enable input of the desired working temperature $T_W$ into the processor 108.

Figure 5:
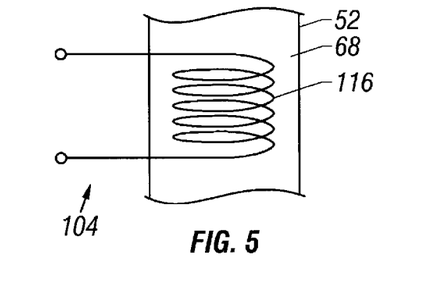
FIG. 5 is a fragmentary schematic view of a heating coil disposed in conduit and immersed in working liquid.

According to a preferred embodiment illustrated in FIG. 5, exemplary heat source 104 may include an electrical coil 116 immersed in the working liquid 68. A power supply 118 may be provided to supply current to the coil 106 to generate resistive heat. As mentioned above, the amount of energy, for example, in terms of electricity passed through the coil 116 to generate heat by electrical resistance, input into the system 50 is much less than the amount of energy generated by the system at the output transmission lines 102. To maximize efficiency, the amount of energy input to the system 50 is minimized.

In this regard, according to a preferred embodiment of the invention, energy generating system 50 is configured to maintain the temperature of the working liquid 68 at or slightly greater than an ambient temperature $T_a(e)$ of the environment in which the conduit 50 is located. For example, if the working liquid 68 is substantially water and if the ambient temperature $T_a(e)$ of the environment is about 80° F., then the ambient temperature $T_a(w)$ of the working liquid 68 is substantially equal to the environmental ambient temperature $T_a(e)$, or about 80° F.

Figure 6:
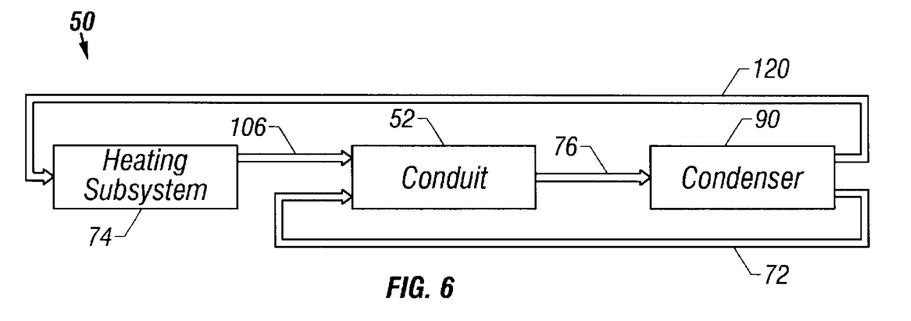
FIG. 6 is a block diagram of an exemplary hydrodynamic energy generating system of the invention in which pumping liquid and latent heat are recycled within the system.

Another preferred embodiment of the energy generating system 50 of the invention is shown in FIG. 6. As discussed above, the efficiency of the system 50 may be enhanced by recycling the pumping gas 76 by employing a condenser 90 in the supply subsystem 54. In addition to providing pumping liquid 72 to the conduit 52, the condenser 90 also outputs heat 120 as a byproduct of the condensation of the pumping gas 76. The supply subsystem 54 of the invention may be configured to provide latent heat 120 to the heating subsystem 74 as an auxiliary source of heat 106 provided to the working liquid 68. Accordingly, the condenser 90 may be configured to function as an alternative heat source 104 of the heating subsystem 74.

Figure 7:
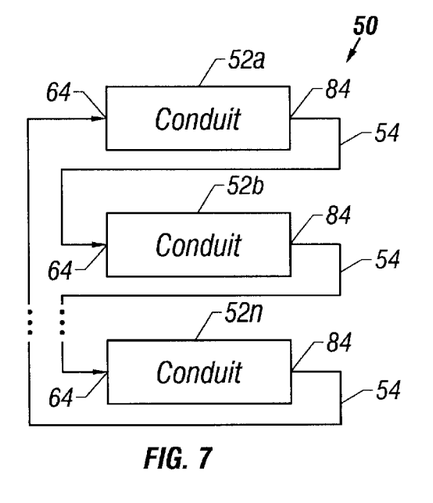
FIG. 7 is a block diagram of an exemplary hydrodynamic energy generating system of the invention in which a plurality of conduits are cascaded together.

In accordance with the present invention, exemplary energy generating system 50 is expandable so that efficiency and output of the system may be enhanced and increased. More specifically, the energy generating system 50 of the invention may include a plurality of the conduits 52a, 52b, . . . , 52n cascaded together as shown in FIG. 7. The multiple conduits 52 may be connected together such that the input port 64 of at least one of the conduits 52 is in communication with the output port 84 of another one of the conduits 52. For example, the input port 64 of conduit 52b may be in communication with output port 84 of conduit 52a; the input port 64 of conduit 52n may be in communication with output port 84 of conduit 52(n−1) (not shown); and the input port 64 of conduit 52a may be in communication with output port 84 of conduit 52n. According, the supply subsystem 54 may be configured to cycle the pumping liquid and gas 72 and 76 throughout any number of the cascaded conduits 52.

Figure 8:
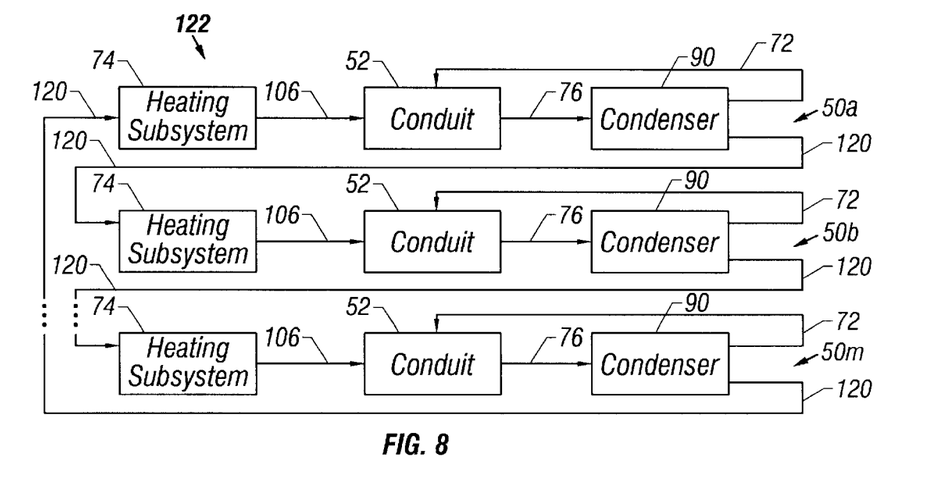
FIG. 8 is a block diagram of an exemplary hydrodynamic energy generating system of the invention in which a plurality of single-conduit energy systems are cascaded together.

An alternative cascaded embodiment is shown in FIG. 8. In addition to recycling the pumping liquid and gas 72 and 76, the latent heat 120 captured by the condenser 90 during condensation of the pumping gas 76 may be harnessed and fed back to the heating subsystem 74 connected to a subsequent conduit 52 in a cascaded energy generating system 122. As shown, the cascaded system 122 includes a plurality of single-conduit systems 50a, 50b, . . . , 50m connected in series. The pumping liquid 72 produced by the condenser 90 of each system 50 may be fed back to a respective conduit 50 as shown in FIG. 8 or, alternatively, may be provided to the conduit 50 of a subsequent system 50 analogous to that shown in FIG. 7. The example of feeding back latent heat 120 shown in FIG. 8 may be implemented by providing the latent heat 120 from the condenser 90 of system 50a to the heating subsystem 74 of system 50b; from system 50b, to system 50c (not shown); . . . ; and from system 50m, to system 50a.

Figure 9:
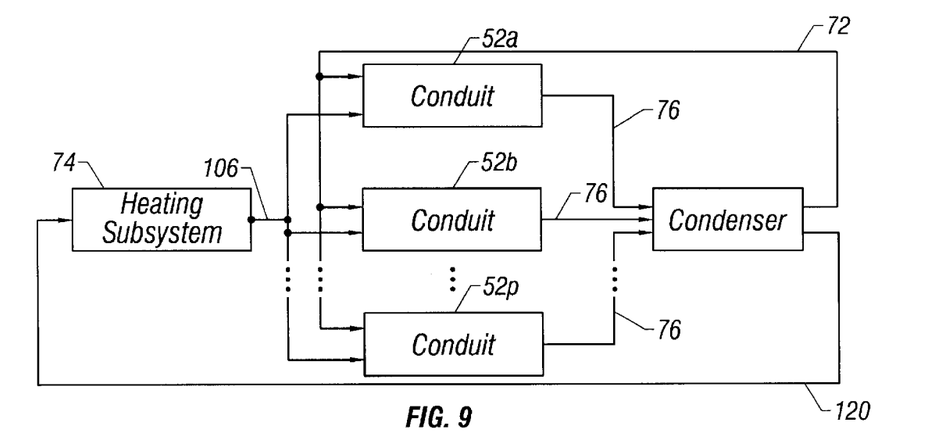
FIG. 9 is a block diagram of an exemplary hydrodynamic energy generating system of the invention in which a plurality of conduits are connected in parallel between a heating subsystem and a condenser.

Yet another alternative embodiment of recycling pumping gas 76 and/or latent heat 120 produced by the condenser 90 is shown in FIG. 9 in which an exemplary system 50 includes a plurality of conduits 52a, 52b, . . . , 52p are connected between a heating subsystem 74 and a condenser 90, preferably being connected in parallel. Accordingly, the heating subsystem 74 receives latent heat 120 from the condenser 90 and provides heat 106 to each of the conduits 52. Similarly, condenser 90 receives pumping gas 76 from each conduit 52 and provides pumping liquid 72 to each conduit 52.

Figure 10:
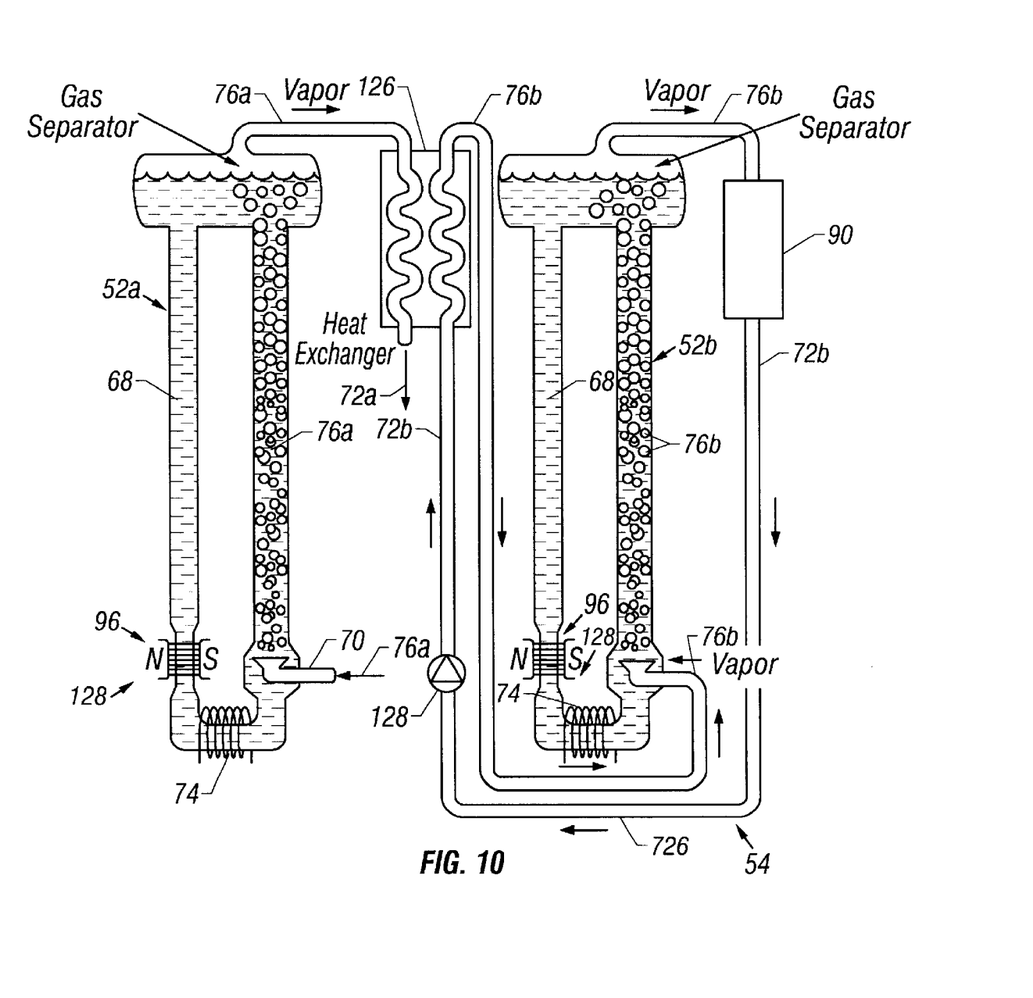
FIG. 10 is a schematic view of an exemplary hydrodynamic energy generating system of the invention in which a plurality of conduits are connected in series.

According to the principles of the present invention, it is preferable to maintain the working temperature $T_W$ of the working liquid 68 at a level slightly above the boiling point $T_{bp}(P)$ of the pumping liquid 72, i.e., $T_W=T_{bp}(p)+\Delta T$, so that the pumping liquid 72 is vaporized upon injection into the working liquid 68. A hydrodynamic energy generating system 124 according to an alternative embodiment of the invention is shown in FIG. 10 in which, rather than injecting pumping liquid 72, pumping gas 76 is injected into the working liquid 68. As the working temperature $T_W$ of the working liquid 68 is greater than the boiling point $T_{bp}(p)$ of the pumping gas 76 by the predetermined temperature differential $\Delta T$, the pumping gas 76 is maintained as a vapor and does not condense.

As shown in FIG. 10, system 124 includes a first and a second conduit 52a and 52b interconnected via a heat exchanger 126. The working liquid 68 of the first conduit 52a is driven by a first working gas 76a which is preferably steam. The working liquid 68 of the second conduit 52b is driven by a second pumping gas 76b. The second pumping gas 76b may be condensed by a condenser 90, thereby providing a second pumping liquid 72a to the heat exchanger 72b. Preferably, the second pumping liquid 72b has a relatively low boiling point so that the heat from the steam 76a vaporizes the second pumping liquid 72b at the heat exchanger 126 to provide the second pumping gas 76b to the second conduit 52b. As a result, the first pumping gas 76a may be condensed at the heat exchanger 126 to provide a first pumping liquid 72a, which, in the embodiment shown, is water.

As shown, a pump 128 may be provided downstream from the condenser 90 and upstream from the heat exchanger 126 to move the pumping liquid 72b through the supply subsystem 54. Also shown in FIG. 10 is an electrical generating plant 96 configured as an alternative embodiment to that shown in FIG. 1. According to this embodiment, plant 96 may be configured as a magnetohydrodynamic (MHD) generator 128 that may be configured in accordance with the art, an example of which is disclosed in U.S. Pat. No. 4,571,534, the entire disclosure of which is incorporated herein by reference.

Figure 11:
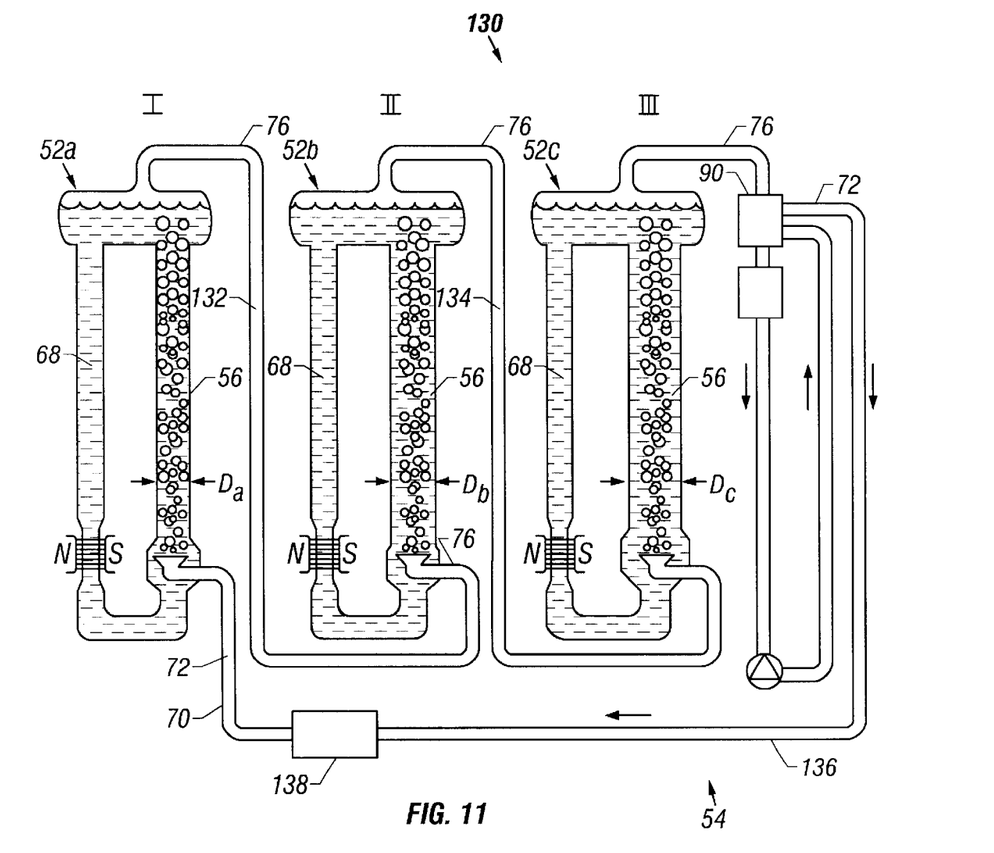
FIG. 11 is a schematic view of an exemplary hydrodynamic energy generating system of the invention in which a plurality of conduits are connected in series according to an alternative embodiment.

Referencing FIG. 11, an exemplary hydrodynamic energy generating system 130 according to an alternative embodiment includes a plurality of conduits 52a, 52b, and 52c. A pumping liquid 72 is injected into the working liquid 68 of the upflow section 56 of the first conduit 52a. The pumping liquid 72 is vaporized to produce pumping gas 76, which then is fed via a vessel 132 to the upflow section 56 of the second conduit 52b. In turn, the pumping gas 76 from the second conduit 52a is fed via a vessel 134 to the upflow section 56 of the third conduit 52c. The pumping gas from the third conduit 52c is then condensed in a condenser 90 and fed via vessel 136 to a pump 138 to be injected back into the first conduit 52a.

As shown in FIG. 11, a diameter D of the upflow section 56 of each subsequent conduit 52a, 52b, and 52c may increase in magnitude, such that:

$$D_a < D_b < D_c.$$

The increase in diameter D of the upflow section 56 of each subsequent conduit 52 accommodates the increase in size of the expanding bubbles of the pumping gas 76, thereby enhancing the efficiency of the overall system.

Figure 12:
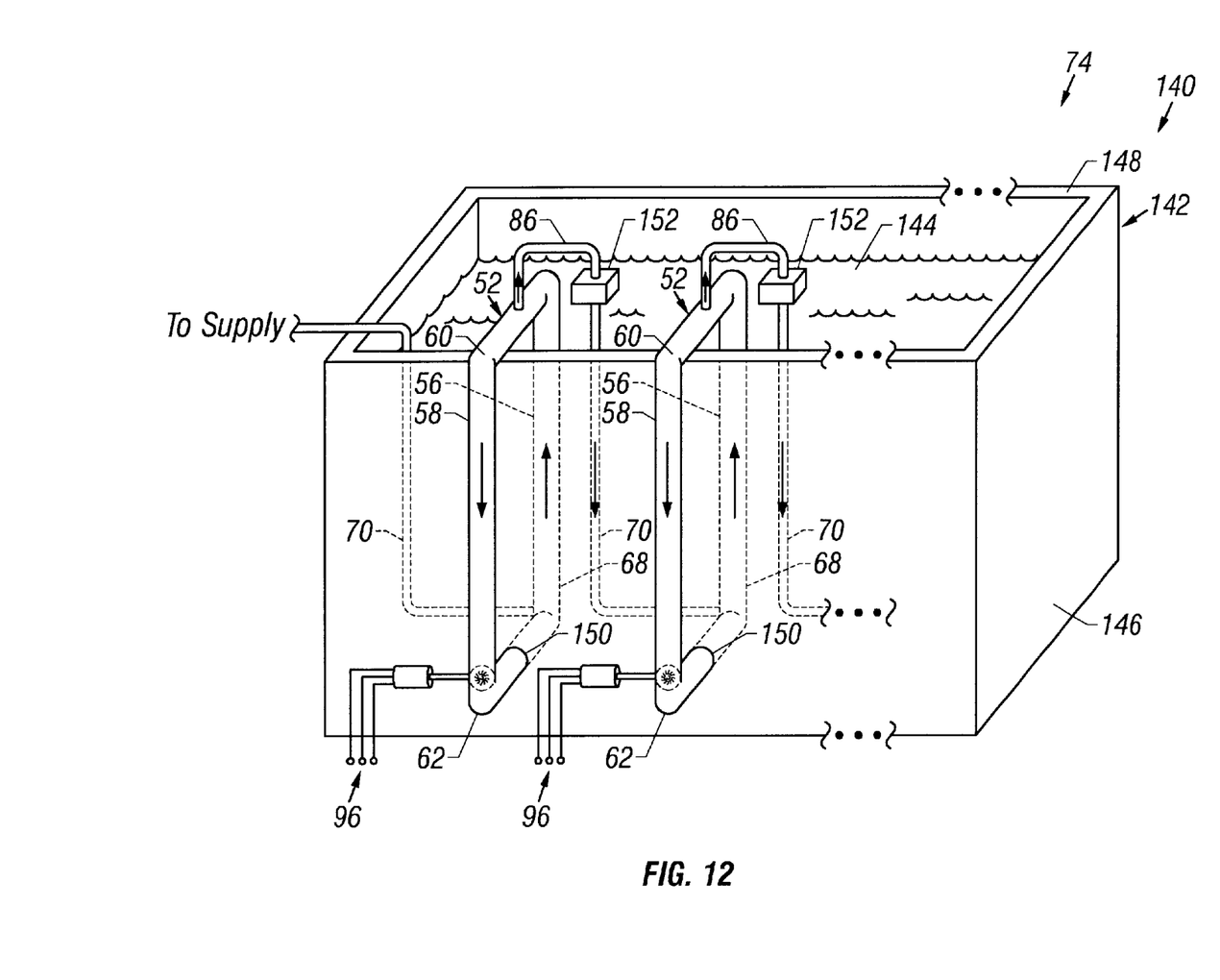
FIG. 12 is a perspective view of an exemplary hydrodynamic energy generating system of the invention in which a plurality of conduits are cascaded together and immersed in a bath as a heat source.

An alternative embodiment of a hydrodynamic energy generating system 140 is illustrated in FIG. 12, particularly an alternative embodiment of the heating subsystem 74 of the invention. Exemplary system 140 includes a plurality of conduits 52 and a tank 142 of heated fluid 144 such as water functioning as the heating subsystem 74 of the system 140. The upflow section 56 of each conduit 52 is disposed within the tank 142 and immersed in the heated fluid 144, while the down section 58 of each conduit 52 is disposed on an outside 146 of the tank 142. By immersing the upflow section 56 of each conduit 52 within the heated fluid 144, the working liquid 68 is heated evenly and efficiently, without temperature variations and fluctuations along the extent of the upflow sections 56.

Depending upon the implementation, the tank 142 may have a top edge 148 over which the top section 60 of each conduit 52 may traverse. Alternatively, the tank 148 may be enclosed. The tank 142 may include a plurality of ports 150 through which the bottom sections 62 of each conduit 52 may pass. The outlet vessel 86 of each conduit 52 may connected to the inlet vessel 70 of a subsequent conduit 52. A pump and/or a condenser 152 may be provided to downstream of each outlet vessel 86. As shown, exemplary system 140 may include one or more the electrical generating plants 96 each configured to harness the hydrodynamic energy of the working liquid 68 in each conduit 52.

Figure 13:
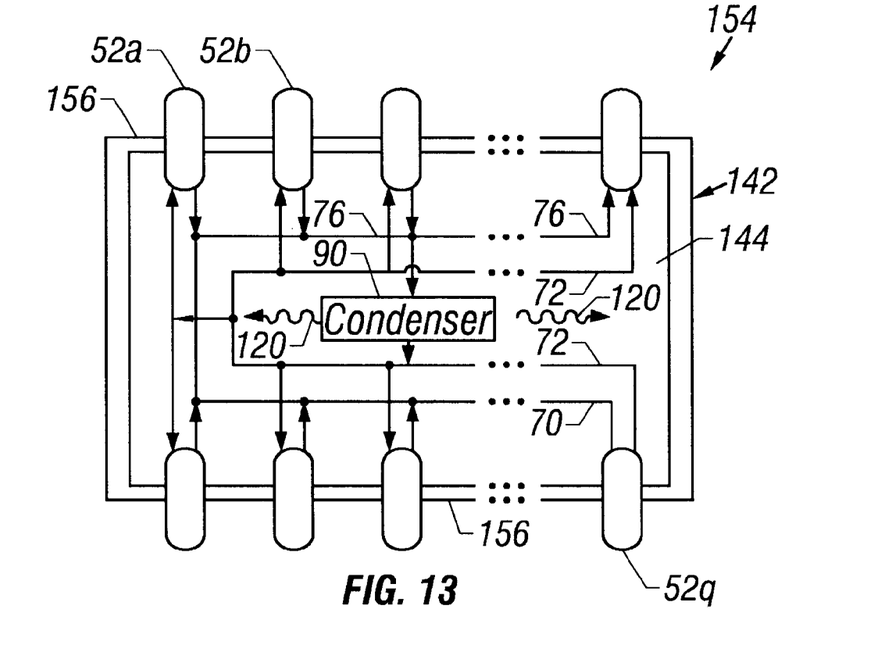
FIG. 13 is a schematic view of an exemplary hydrodynamic energy generating system of the invention in which a plurality of conduits are cascaded together and immersed in a bath as a heat source, with a single condenser.
Figure 14:
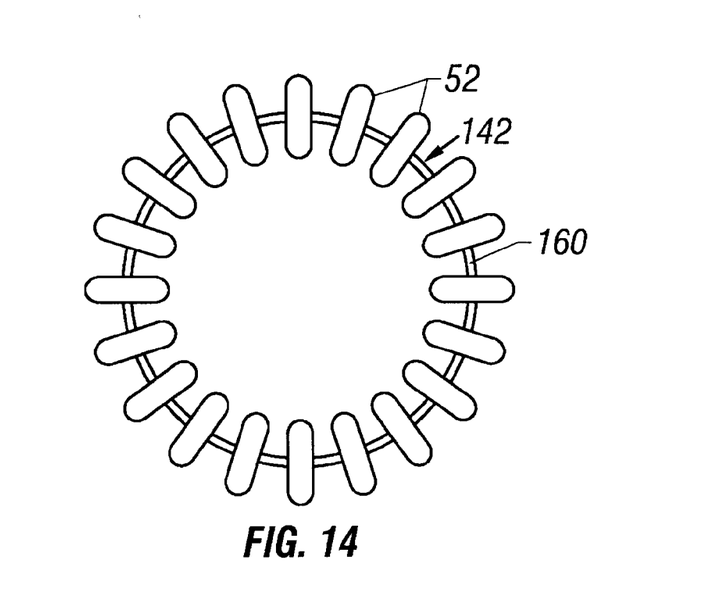
FIG. 14 is a schematic view of an exemplary hydrodynamic energy generating system in which a plurality of conduits are connected in series and immersed in a bath as a heat source according to an alternative embodiment of the invention.

An alternative embodiment of an energy generating system 154 is shown in FIG. 13 in which a plurality of conduits 52a, 52b, . . . , 52q are disposed on more than one side 156 of a tank 142 (which is shown in a top view). In addition, a single condenser 90 is provided to receive the pumping gas 76 from each of the conduits 52 and to provide pumping liquid 72 to each of the conduits 52. The condenser 90 is preferably immersed in the heated fluid 144 so that the latent heat 120 from the condenser 90 is either a primary or a secondary heat source for the heating subsystem 74. Rather than being configured rectilinearly, the tank 142 may be circular such as that shown in FIG. 14 where the conduits 52 are disposed about a perimeter 160 the tank 142.

Those skilled in the art will understand that the preceding exemplary embodiments of the present invention provide the foundation for numerous alternatives and modifications thereto. These other modifications are also within the scope of the present invention such that the present invention is not limited to that precisely as shown and described in the present invention.

What is claimed is:

1. Apparatus for generating hydrodynamic energy, the apparatus comprising:
    a conduit including an upflow section and an input port disposed at a lower portion of the upflow section, the conduit for receiving a working liquid having an ambient temperature and a boiling point;
    a supply subsystem including a vessel in communication with the input port of the conduit, the supply subsystem configured to provide to the conduit via the vessel a pumping liquid having a boiling point greater than the ambient temperature of the working liquid and less than the boiling point of the working liquid; and
    a heating subsystem configured to heat the working liquid received within the conduit to a temperature greater than the boiling point of the pumping liquid by a predetermined differential;
    whereby the pumping liquid is vaporized after passing through the input port into the working fluid, thereby generating pumping gas that causes the working liquid to flow upwardly in the upflow section and to circulate in the conduit.

2. Apparatus as claimed in claim 1 wherein the working liquid includes water.

3. Apparatus as claimed in claim 2 wherein the ambient temperature of the working liquid is less than about 120° F.

4. Apparatus as claimed in claim 3 wherein the boiling point of the pumping liquid is less than about 70° F.

5. Apparatus as claimed in claim 4 wherein the predetermined differential is less than about 10° F.

6. Apparatus as claimed in claim 1 wherein the supply subsystem includes an inlet disposed in the conduit at an upper portion of the upflow section through which the pumping gas is passable.

7. Apparatus as claimed in claim 6 wherein the supply subsystem includes a condenser connected to the inlet for condensing the pumping gas into pumping liquid.

8. Apparatus as claimed in claim 7 wherein the condenser is in communication with the output port for supplying the pumping liquid to the output port.

9. Apparatus as claimed in claim 6 further comprising a plurality of the conduits cascaded together such that the inlet of the supply subsystem of one of the conduits is in communication with to the output port of another one of the conduits.

10. Apparatus as claimed in claim 1 wherein the heating subsystem includes a heating element disposed at the conduit.

11. Apparatus as claimed in claim 1 wherein the heating subsystem includes a tank with heated fluid in which the lower portion of the upflow section of the conduit is disposed.

12. Apparatus as claimed in claim 11 further comprising a plurality of the conduits with at least the lower portion of the upflow section thereof immersed in the heated fluid in the tank.

13. Apparatus as claimed in claim 1 wherein the heating subsystem includes a sensor disposed upstream of the output port for monitoring a temperature of the working liquid.

14. A method for generating hydrodynamic energy, the method comprising:
    providing:
        a conduit including an upflow section and an input port disposed at a lower portion of the upflow section, the conduit for receiving a working liquid having an ambient temperature and a boiling point;
        a supply subsystem including a vessel in communication with the input port of the conduit, the supply subsystem configured to provide to the conduit via the vessel a pumping liquid having a boiling point greater than the ambient temperature of the working liquid and less than the boiling point of the working liquid; and heating the working liquid to a temperature greater than the boiling point of the liquid by a predetermined differential so that the pumping liquid is vaporized upon passing through the input port into the working liquid, thereby generating pumping gas and causing the working liquid to flow upwardly in the upflow section and to circulate in the conduit.

15. A method as claimed in claim 14 wherein the heating step comprises:

heating the working liquid to a temperature less than about 10° F. greater than the boiling point of the pumping liquid.

16. A method as claimed in claim 14 further comprising:

providing a plurality of the conduits.

17. A method as claimed in claim 16 wherein each of the conduits includes an output port disposed downstream of the upflow section, the method further comprising:

connecting the plurality of the conduits in series such that the input port of one of the conduits is in communication with the output port of another one of the conduits.

18. An electricity generating system comprising:

a conduit including an upflow section and an input port disposed at a lower portion of the upflow section, the conduit for receiving a working liquid having an ambient temperature and a boiling point;

a supply subsystem including a vessel in communication with the input port of the conduit, the supply subsystem configured to provide to the conduit via the vessel a pumping liquid having a boiling point greater than the ambient temperature of the working liquid and less than the boiling point of the working liquid;

a heating subsystem configured to heat the working liquid received within the conduit to a temperature greater than the boiling point of the pumping liquid by a predetermined differential such that the pumping liquid is vaporized after passing through the input port into the working fluid, thereby generating pumping gas that causes the working liquid to flow upwardly in the upflow section and to circulate the working liquid within the conduit, thereby generating hydrodynamic energy; and an electrical generating plant configured to harness the hydrodynamic energy of the working liquid to generate electricity.

19. A system as claimed in claim 18 wherein the electrical generating plant includes a turbine disposed within the conduit and a generator operatively connected to the turbine.

20. A system as claimed in claim 18 further comprising a plurality of the conduits;

the electrical generating plant being configured to harness the hydrodynamic energy of the working liquid of each of the conduits.

* * * * *